(12) United States Patent
Aguila

(10) Patent No.: US 6,685,166 B1
(45) Date of Patent: Feb. 3, 2004

(54) VALVE ASSEMBLY

(76) Inventor: Rafael A. Aguila, 36 Shelby St., Worcester, MA (US) 01605

( * ) Notice: Subject to any disclaimer, the term of this patent is extended or adjusted under 35 U.S.C. 154(b) by 222 days.

(21) Appl. No.: 09/910,261

(22) Filed: Jul. 20, 2001

(51) Int. Cl.[7] .............................................. F16K 31/00
(52) U.S. Cl. ..................................... 251/335.3; 251/264
(58) Field of Search ................................. 251/264, 333, 251/335.1, 335.3

(56) References Cited

U.S. PATENT DOCUMENTS

| | | | |
|---|---|---|---|
| 1,844,553 A | * | 2/1932 | Barlow .......................... 236/56 |
| 1,923,306 A | * | 8/1933 | Hagen .......................... 251/318 |
| 2,693,822 A | * | 11/1954 | Gerow et al. ................. 137/551 |
| 2,895,708 A | * | 7/1959 | Palumbo ....................... 251/77 |
| 4,214,727 A | | 7/1980 | Baram |
| 4,475,899 A | | 10/1984 | Muller |
| 4,535,967 A | | 8/1985 | Babbitt et al. |
| D287,268 S | | 12/1986 | Hilpert et al. |
| 5,769,387 A | | 6/1998 | Perez |
| 5,915,410 A | | 6/1999 | Zajac |

* cited by examiner

Primary Examiner—Edward K. Look
Assistant Examiner—John K Fristor, Jr.

(57) ABSTRACT

A valve assembly for creating a seal between a valve stem and a valve housing includes a valve housing having a first end wall, a second end, and a peripheral wall extending between the first and second ends walls such that a lumen is defined. Each of the first and second ends has an opening extending therethrough and into the lumen. A valve stem has a first end extending through the peripheral wall and toward the opening in the first end wall. A plate is attached to the first end of the stem. The plate is positionable over the opening in the first end wall. A sleeve is positioned in the housing and extends over the stem. The sleeve is positioned in the housing and extends over the stem. The sleeve is attached to the peripheral wall and the plate such that the sleeve is closed off from the lumen.

6 Claims, 3 Drawing Sheets

VALVE ASSEMBLY

BACKGROUND OF THE INVENTION

1. Field of the Invention The present invention relates to valve devices and more particularly pertains to a new valve assembly for creating a seal between a valve stem and a valve housing.

2. Description of the Prior Art

The use of valve devices is known in the prior art. More specifically, valve devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,915,410; U.S. Pat. No. 4,475,899; U.S. Pat. No. 5,769,387; U.S. Pat. No. 4,214,727; U.S. Pat. No. 4,535,967; and U.S. Des. Pat. No. 287,268.

While these devices fulfill their respective, particular objectives and requirements, the aforementioned patents do not disclose a new valve assembly. The inventive device includes a valve housing having a first end wall, a second end, and a peripheral wall extending between the first and second ends walls such that a lumen is defined within the valve housing. Each of the first and second ends has an opening extending therethrough and into the lumen. The valve housing having a bend therein such that a first section and a second section are defined. The first section is orientated generally perpendicular to the second section. The first section abutting the first end wall. A valve is positioned in the valve housing and is adapted for selectively opening and closing the opening in the first end wall. The valve includes a valve stem is elongated and has a first end and a second end. The valve stem extends through the peripheral wall of the second section such that the first end extends toward the opening in the first end wall. A plate is located in the valve housing. The plate has a first surface and a second surface. The second surface is attached to the first end of the plate. A sleeve is positioned in the housing and extends over the stem. The sleeve has a first end securely attached to the peripheral wall and a second end attached to the second surface. The stem is extendable into the valve housing such that the stem urges the plate against the first end wall and closes the opening in the first end wall.

In these respects, the valve assembly according to the present invention substantially departs from the conventional concepts and designs of the prior art, and in so doing provides an apparatus primarily developed for the purpose of creating a seal between a valve stem and a valve housing.

SUMMARY OF THE INVENTION

In view of the foregoing disadvantages inherent in the known types of valve devices now present in the prior art, the present invention provides a new valve assembly construction wherein the same can be utilized for creating a seal between a valve stem and a valve housing.

The general purpose of the present invention, which will be described subsequently in greater detail, is to provide a new valve assembly apparatus and method which has many of the advantages of the valve devices mentioned heretofore and many novel features that result in a new valve assembly which is not anticipated, rendered obvious, suggested, or even implied by any of the prior art valve devices, either alone or in any combination thereof.

To attain this, the present invention generally comprises a valve housing having a first end wall, a second end, and a peripheral wall extending between the first and second ends walls such that a lumen is defined within the valve housing. Each of the first and second ends has an opening extending therethrough and into the lumen. The valve housing having a bend therein such that a first section and a second section are defined. The first section is orientated generally perpendicular to the second section. The first section abutting the first end wall. A valve is positioned in the valve housing and is adapted for selectively opening and closing the opening in the first end wall. The valve includes a valve stem is elongated and has a first end and a second end. The valve stem extends through the peripheral wall of the second section such that the first end extends toward the opening in the first end wall. A plate is located in the valve housing. The plate has a first surface and a second surface. The second surface is attached to the first end of the plate. A sleeve is positioned in the housing and extends over the stem. The sleeve has a first end securely attached to the peripheral wall and a second end attached to the second surface. The stem is extendable into the valve housing such that the stem urges the plate against the first end wall and closes the opening in the first end wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new valve assembly apparatus and method which has many of the advantages of the valve devices mentioned heretofore and many novel features that result in a new valve assembly which is not anticipated, rendered obvious, suggested, or even implied by any of the prior art valve devices, either alone or in any combination thereof.

It is another object of the present invention to provide a new valve assembly which may be easily and efficiently manufactured and marketed.

It is a further object of the present invention to provide a new valve assembly which is of a durable and reliable construction.

An even further object of the present invention is to provide a new valve assembly which is susceptible of a low cost of manufacture with regard to both materials and labor, and which accordingly is then susceptible of low prices of sale to the consuming public, thereby making such valve assembly economically available to the buying public.

Still yet another object of the present invention is to provide a new valve assembly which provides in the apparatuses and methods of the prior art some of the advantages thereof, while simultaneously overcoming some of the disadvantages normally associated therewith.

Still another object of the present invention is to provide a new valve assembly for creating a seal between a valve stem and a valve housing.

Yet another object of the present invention is to provide a new valve assembly which includes a valve housing having a first end wall, a second end, and a peripheral wall extending between the first and second ends walls such that a lumen is defined within the valve housing. Each of the first and second ends has an opening extending therethrough and into the lumen. The valve housing having a bend therein such that a first section and a second section are defined. The first section is orientated generally perpendicular to the second section. The first section abutting the first end wall. A valve is positioned in the valve housing and is adapted for selectively opening and closing the opening in the first end wall. The valve includes a valve stem is elongated and has a first end and a second end. The valve stem extends through the peripheral wall of the second section such that the first end extends toward the opening in the first end wall. A plate is located in the valve housing. The plate has a first surface and a second surface. The second surface is attached to the first end of the plate. A sleeve is positioned in the housing and extends over the stem. The sleeve has a first end securely attached to the peripheral wall and a second end attached to the second surface. The stem is extendable into the valve housing such that the stem urges the plate against the first end wall and closes the opening in the first end wall.

Still yet another object of the present invention is to provide a new valve assembly that is used as a conventional valve for controlling the flow of a liquid or a gas. The device uses a stem which itself is sealed within the valve housing such that the valve stem is isolated from the interior of the housing. Conventional valves have valve stems which have a seal between the valve and the peripheral wall. These seals may eventually fail and allow the escape of hazardous gases or liquids. Since the stem is positioned within a sleeve, the user has less concern that any liquids or gases will escape.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
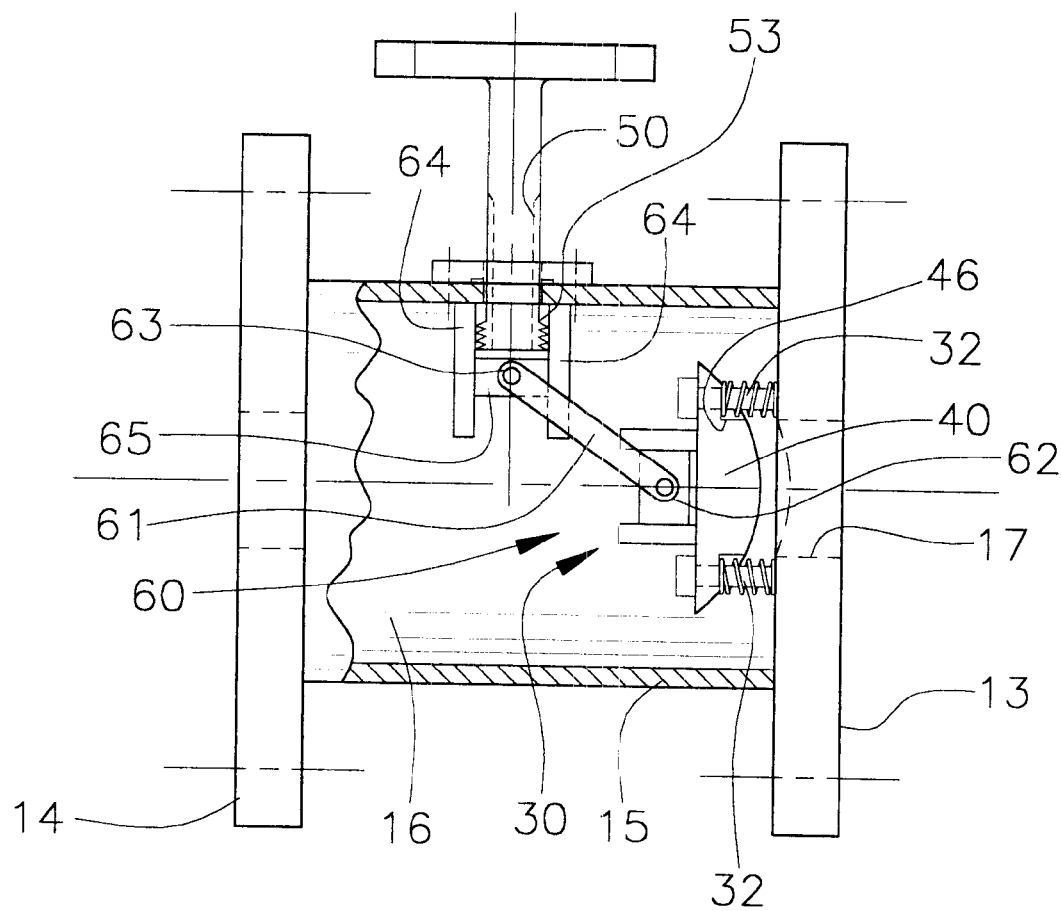
FIG. 1 is a schematic cross-sectional view of the third embodiment of a new valve assembly according to the present invention.
Figure 2:
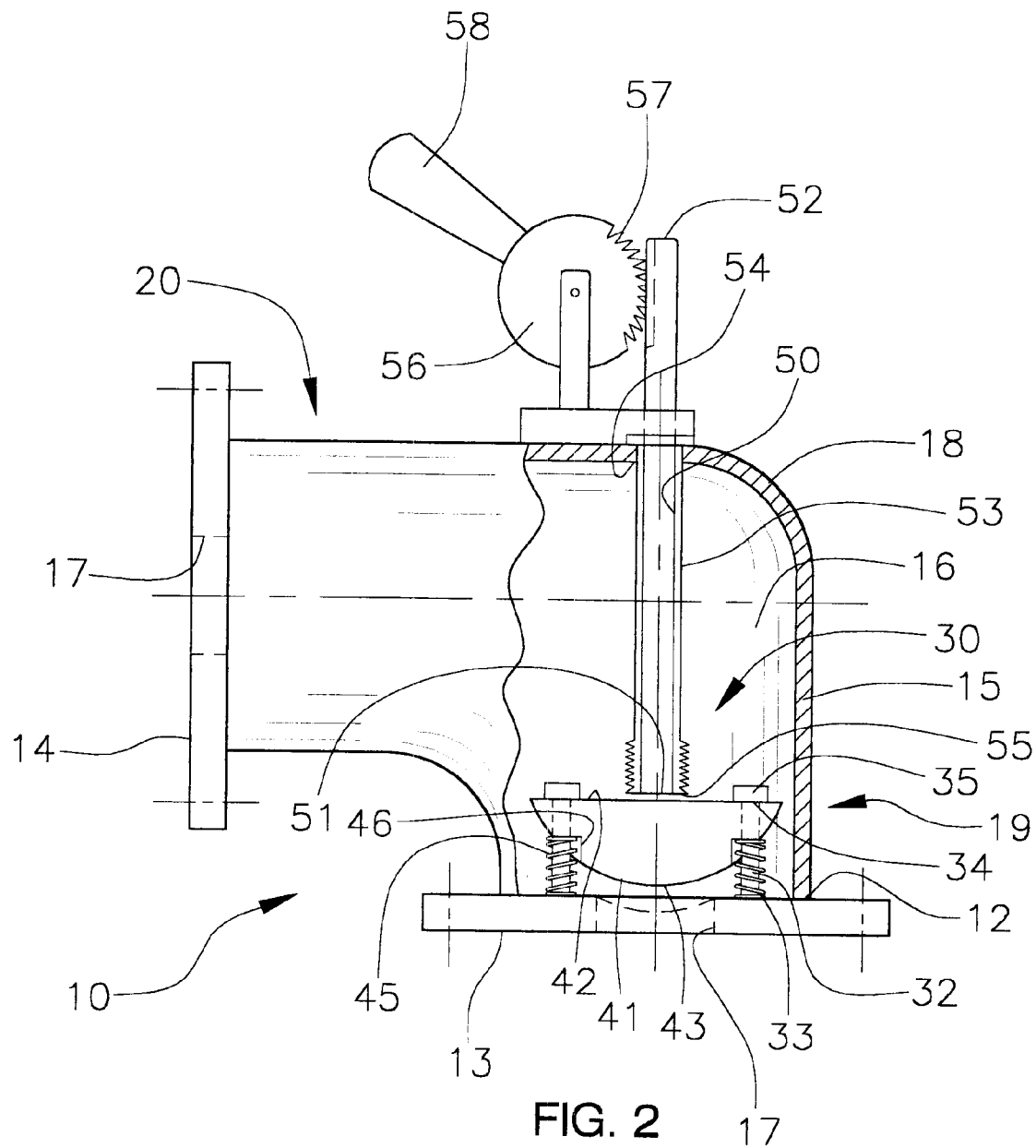
FIG. 2 is a schematic cross-sectional view of the first embodiment of the present invention.
Figure 3:
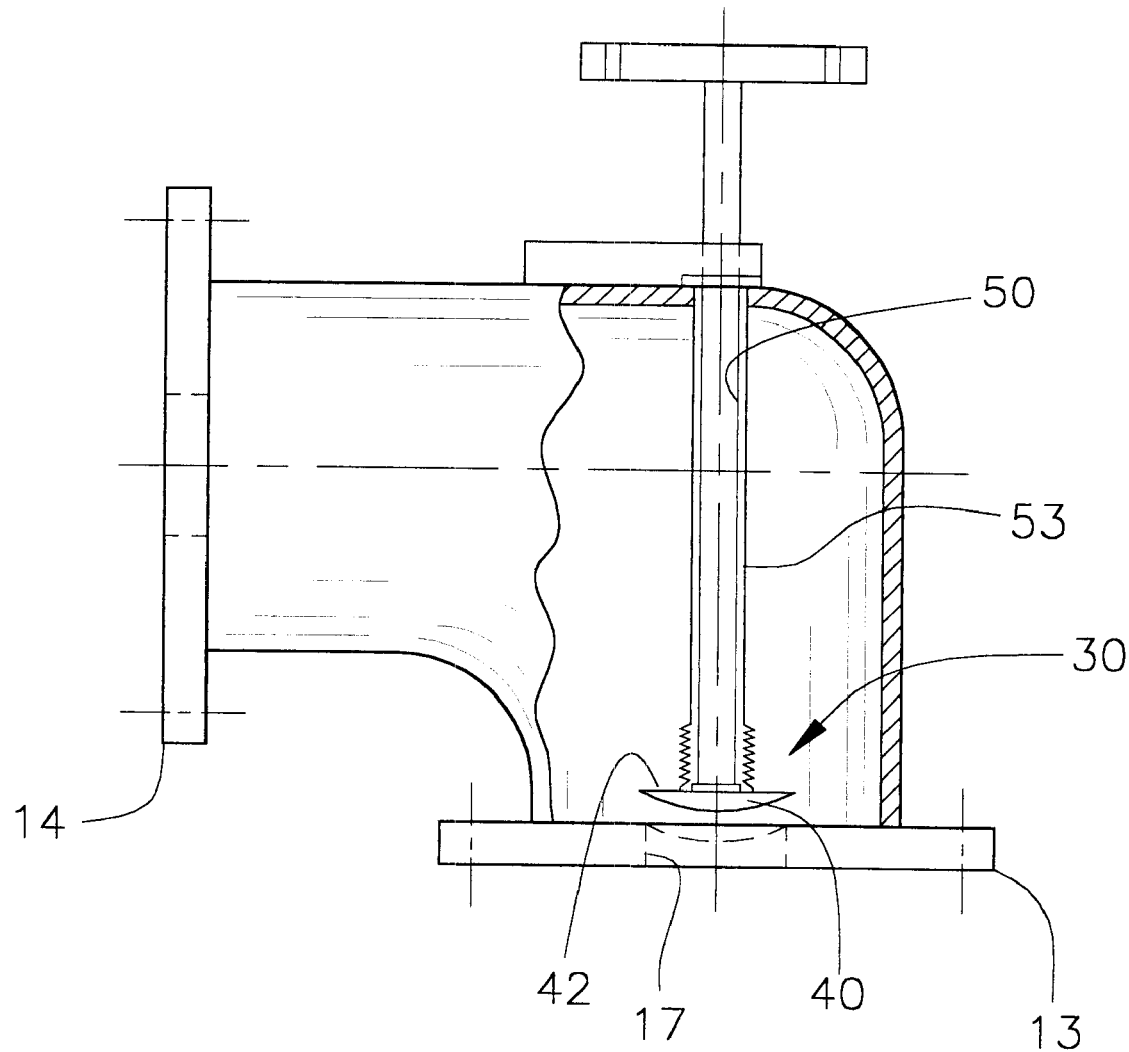
FIG. 3 is a schematic cross-sectional of the second embodiment view of the present invention.

With reference now to the drawings, and in particular to FIGS. 1 through 3 thereof, a new valve assembly embodying the principles and concepts of the present invention and generally designated by the reference numeral 10 will be described.

As best illustrated in FIG. 2, the first embodiment of the valve assembly 10 generally comprises a valve housing 12 having a first end wall 13, a second end 14, and a peripheral wall 15 extending between first 13 and second 14 ends walls such that a lumen 16 is defined within the valve housing 12. Each of the first 13 and second 14 ends has an opening 17 extending therethrough and into the lumen 16. The valve housing 12 has a bend 18 therein such that a first section 19 and a second section 20 are defined. The first section 19 is orientated generally perpendicular to the second section 20. The first section 19 abuts the first end wall 13.

A valve 30 is positioned in the valve housing 12 and is adapted for selectively opening and closing the opening 17 in the first end wall 13. The valve 30 includes a plurality of guide rods 32 each having a first end 33 attached to an inner surface of the first end wall 13 and a second end 34 extending away from the first end wall 13. Each of the second ends 34 has a bulbous member 35 thereon.

A plate 40 is movably positioned on the rods 32 such that the rods 32 extend through the plate 40. The plate 40 is movable between the first end wall 13 and the bulbous members 35. The plate 40 has a first surface 41 facing the first end wall 13 and a second surface 42 facing the bulbous members 35. The first surface 41 has a convex shape such that an apex 43 is defined. The apex 43 is extendable into the opening 17 in the first end wall 13 such that a seal may be formed by the first surface 41 and an edge of the opening 17 in the first end wall 13.

A plurality of biasing members 45 biases the plate 40 away from the first end wall 13. Each of the biasing members 45 comprises a spring positioned one of the guide rods 32. Each of the springs 45 is positioned between the first end wall 13 and the first surface 41 of the plate 40. The first surface 41 has a plurality of depressions 46 therein. Each of the depressions 46 is positioned for receiving one of the springs 45.

A valve stem 50 is elongated and has a first end 51 and a second end 52. The valve stem 50 extends through the peripheral wall 15 of the second section 20 such that the first end 51 extends toward the second surface 42 of the plate 40.

A sleeve 53 is elongated and has a first open end 54 and a second closed end 55. The sleeve 53 is positioned in the housing 12. The first open end 54 of the sleeve 53 is securely attached to the peripheral wall 15 such that the stem 50 extends into the sleeve 53. The sleeve 53 is preferably corrugated and is positionable between an extended position and a retracted position. Ideally the sleeve 53 is air impermeable. The sleeve 53 prevents any loss of liquids or gasses between the stem 50 and the peripheral wall 15.

In using the first embodiment of the device 10, the stem 50 is extendable into the valve housing 12 such that the stem 50 urges the plate 40 against the first end wall 13. The stem 50 in FIG. 2 is in communication with the teeth 57 of a gear 56 rotatably coupled to the outer surface of the peripheral wall 15. A bar 58 is attached to the gear 56 for actuating the gear 56 such that the gear 56 raises and lowers the stem 50 with respect to the valve housing 12.

The second embodiment is depicted in FIG. 3. Instead of rods and biasing members, the plate 40 is attached directly to the valve stem 50. The sleeve 53 extends over the stem 50 and is attached to the peripheral wall 15 and the second surface 42 of the plate 40. When the stem 50 is extended downward, the apex 43 of the first surface 41 of the plate 40 extends into the opening 17 and closes the opening. The stem 50 is preferably threaded for threadably engaging the peripheral wall 15 of the valve housing 12. In the second embodiment, the rods 32 and biasing members 45 may be utilized as in the first embodiment. It should also be noted that in all instances, the biasing members 45 may be positioned between the plate 40 and the bulbous members 35 for biasing the plate 40 toward the first end wall 13.

The third embodiment is shown in FIG. 3 and uses a generally straight valve housing 12 and a lever assembly 60 is included with the valve 30 to actuate the valve 30. The valve stem 50 extends through the peripheral wall 15 and the plate 40 is positioned on the rods 32 and biased away from the first end wall 14. The sleeve 53 extends over the valve stem 50 as in the first embodiment. A bar 61 has a first end 62 and a second end 63. The first end 62 of the bar 61 is pivotally coupled to the second surface 42 of the plate 40. A pair of tracks 64 is attached to an inner surface of the peripheral wall 15 such that the stem 50 is extendable between the tracks 64. A block 65 is positioned between and is movable along the tracks 64. The second end 63 of the bar 61 is pivotally coupled to the block 65. An angle between the bar 61 and the stem 50 is greater than 90 degrees when the plate 40 is positioned away from the first end wall 13 such that the plate 40 is urged toward and covers the opening 17 in the first end wall 13 when the stem 50 is extended into the valve housing 12. The lever assembly 60 closes the opening 17 such that liquids or gasses are not movable through the valve housing 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sealed valve assembly comprising:

a valve housing having a first end wall, a second end wall, and a peripheral wall extending between first and second end walls such that a lumen is defined within said valve housing, each of said first and second ends having an opening extending therethrough and into said lumen, said valve housing having a bend therein such that a first section and a second section are defined, said first section being orientated generally perpendicular to said second section, said first section abutting said first end wall;

a valve being positioned in said valve housing and being adapted for selectively opening and closing said opening in said first end wall, said valve comprising;

a valve stem being elongated and having a first end and a second end, said valve stem extending through said peripheral wall of said second section such that said first end extends toward said opening in said first end wall;

a plate being located in said valve housing, said plate having a first surface and a second surface, said second surface being attached to said first end of said valve stem;

a sleeve being positioned in said housing and extending over said stem, said sleeve having a first end securely attached to said peripheral wall and a second end attached to said second surface, said sleeve extending through said perimeter wall such that said first end of said sleeve is coupled to an exterior surface of said valve housing to inhibit said sleeve being inadvertently separated from said peripheral wall when said valve stem is actuated;

wherein said stem is extendable into said valve housing such that said stem urges said plate against said first end wall and closes said opening in said first end wall.

2. The sealed valve assembly as in claim 1, further including a plurality of guide rods each having a first end attached to an inner surface of said first end wall and a second end extending away from said first end wall, each of said guide rods having a second end having a bulbous member thereon, said guide rods extending through said plate.

3. The sealed valve assembly as in claim 1, wherein said first surface has a convex shape such that an apex is defined, said apex being extendable into said opening in said first end wall such that a seal may be formed by said first surface and an edge of said opening in said first end wall.

4. The sealed valve assembly as in claim 2, further including a plurality of biasing members for biasing said plate away from said first and wall, each of said biasing members comprising a spring positioned one of said guide rods, each of said springs being positioned between said first end wall and said first surface of said plate.

5. The sealed valve assembly as in claim 4, wherein said first surface has a plurality of depressions therein, each of said depressions being positioned for receiving one of said springs.

6. The sealed valve assembly as in claim 1, wherein said sleeve is corrugated and being positionable between an extended position and a retracted position.

* * * * *